United States Patent [19]

Schwartz et al.

[11] Patent Number: 5,428,619
[45] Date of Patent: Jun. 27, 1995

[54] MODEL BASED REASONING SYSTEM FOR NETWORK FAULT DIAGNOSIS

[75] Inventors: Steven H. Schwartz, Brookline; Mark R. Adler; Meyer A. Billmers, both of Lexington; Michael G. Carifo, Shrewsbury, all of Mass.

[73] Assignee: Digital Equipment Corporation, Maynard, Mass.

[21] Appl. No.: 337,903

[22] Filed: Nov. 14, 1994

Related U.S. Application Data

[63] Continuation of Ser. No. 31,050, Mar. 11, 1993, abandoned, which is a continuation of Ser. No. 480,576, Feb. 15, 1990, abandoned.

[51] Int. Cl.$^6$ .......................................... H04B 17/00
[52] U.S. Cl. .................. 371/20.1; 371/15.1; 395/916
[58] Field of Search ............ 371/11.2, 15.1, 20.1; 395/916

[56] References Cited

U.S. PATENT DOCUMENTS

| | | | |
|---|---|---|---|
| 4,697,243 | 9/1987 | Moore et al. | 364/513 |
| 4,803,683 | 2/1989 | Mori et al. | 371/19 |
| 4,817,092 | 3/1989 | Denny | 371/11.3 |
| 4,829,426 | 5/1989 | Burt | 364/513 |
| 4,866,635 | 9/1989 | Kahn et al. | 395/911 X |

OTHER PUBLICATIONS

Marques, T., "A Symptom-Driven Expert System for Isolating and Correcting Network Faults", *IEEE Communications Magazine*, Mar. 1988, vol. 26, No. 3, pp. 6–13.

Sutter, M., et al., "Designing Expert Systems for Real-Time Diagnosis of Self-Correcting Networks", *IEEE Network Magazine*, Sep. 1988, pp. 43–51.

Yoshida, M. et al; *Review of The Electrical Communications Laboratory*, "Application of Knowledge Engineering to Computer Systems Diagnosis", vol. 37, No. 1, (Jan. 1989) Tokyo, Japan, pp. 9–14.

Barry, M. R., *The Annual AI Systems In Government Conference*; "PX1: A Space, Shuttle Mission Operations Knowledge-Based System Project"; 27–31 (May 1989), Washington, USA; pp. 175–178.

Mathonet, R., Van Cottenhem, H., and Vanryckeghem, L., "DANTES: An Expert System for Real-Time Network Troubleshooting." Proceedings of the Tenth International Joint Conference on Artificial Intelligence, Aug. 23–28, 1987, pp. 527–530.

Goffaux, L. and Mathonet, R., "A Technique for Customizing Object-Oriented Knowledge Representation Systems, With an Application to Network Problem Management." Proceedings of the Eleventh International Joint Conference on Artificial Intelligence, Aug. 20–25, 1989, pp. 97–103.

Goodman, R. et al., "Real Time Autonomous Expert Systems in Network Management", in *Integrated Network Management, I*, Meandzya, B. et al. (eds.), Elsevier Science Publishers, 1989, pp. 599–624.

*Primary Examiner*—Stephen M. Baker
*Attorney, Agent, or Firm*—Kenyon & Kenyon

[57] ABSTRACT

A model-based reasoning system for diagnosing faults in a computer network has an information base that stores information about the computer network. This information includes the topology of the network, a class hierarchy containing a component library and diagnostic expertise, and a diagnosis episode. A diagnosis engine receives a pointer to a situation. Each situation includes a focus role and a most general class for the focus role. Based upon this situation, the diagnosis engine creates a diagnosis episode, using the information stored in the information base.

38 Claims, 6 Drawing Sheets

MODEL BASED REASONING SYSTEM FOR NETWORK FAULT DIAGNOSIS

This is a continuation of application Ser. No. 08/031,050 filed Mar. 11, 1993, now abandoned, which is a continuation of application Ser. No. 07/480,576 filed Feb. 15, 1990, now abandoned.

FIELD OF THE INVENTION

The present invention relates to network fault diagnosis, and more particularly, to a model-based reasoning system that diagnoses faults in local area networks (LANs).

BACKGROUND OF THE INVENTION

A computer network, such as a local area network (LAN), will have many different intercoupled components. As such, the network will have many areas in which a fault may occur. After a fault occurs, a human diagnostician will normally troubleshoot the LAN by performing tests on the specific components in the LAN based upon his prior experiences of troubleshooting.

Computer networks are becoming increasingly heterogeneous, with different vendors' equipment—running different network protocols—communicating, cooperating and competing to serve a customer's enterprise. Contemporary network troubleshooting methods are not sufficient to manage the complex, multi-vendor networks. To provide the best customer service, new approaches are needed for network fault diagnosis.

Previous artificial intelligence approaches to network diagnosis have been described which use rule-based reasoning, in which rules specify a diagnosis for a system based upon the fulfillment of rule conditions. This approach is very brittle and requires an extremely large set of rules to deal with enough situations to provide a useful diagnostic tool.

An alternative approach to rule-based reasoning is model-based reasoning, an artificial intelligence technology in which structural and functional information about an object, such as a component of a computer network or the network itself, is derived from a model of the object. Model-based reasoning allows a more robust approach to diagnosis. However, model-based reasoning approaches have been criticized as requiring excessively "deep" knowledge of the individual network components. There is a need for a network troubleshooting system using model-based reasoning techniques that can diagnose faults in arbitrarily complex computer networks comprising heterogeneous equipment, while overcoming the requirement of "deep" knowledge. Such a system needs to deduce the nature and location of structural faults, using a model of the network, a model of diagnostic expertise, and behavioral descriptions including reported malfunctions.

SUMMARY OF THE INVENTION

These and other needs are met by the present invention which provides a system for diagnosing network faults in a computer network by applying information that is relevant to the fault diagnosis process. This relevance is determined —with the use of model-based reasoning—by the structure of the network components, the topology of the network, and the causal relationship or interaction among components. The model-based reasoning system of the present invention uses both general and specific techniques of diagnosis so that the reasoning system can be used to diagnose different or evolving networks. A mechanism termed "the most general class" mechanism is used to target the appropriate knowledge structures in the model-based reasoning system. The model-based reasoning system actively probes the computer network, and, when necessary, elicits data that either proves or refutes active diagnosis hypotheses, as well as gathers additional information to refine the diagnostic strategy. The reasoning system also provides a tunable agenda scheduling mechanism which assesses and acts on the cost and benefit of associated troubleshooting actions. The reasoning system attempts to isolate the fault at a minimal cost, in terms of both the impact on the network itself and manpower requirements.

The model-based reasoning system of the present invention uses a data structure called a situation, which represents an assertion that may be true or false about a LAN or a subset of its components. Troubleshooting knowledge from an expert is used to tie general and specific diagnosis techniques to the situation at hand. The model-based reasoning system instantiates appropriate situations using both a model of the network under consideration (i.e. a network topology model) and an object-oriented network component class hierarchy.

Each situation has "roles" that are bound to components in the network of interest. One of the components in the network—or an aggregate of components—will play a "focus" role, while other components (or aggregates) will play "supporting" roles in the situation. The binding of a role to a component is determined by the current network topology model and is restricted by the component class hierarchy. The focus role is the index into the class hierarchy which contains diagnostic information linking related situations.

The MGC (Most General Class) of the focus role in the reported problem (or root situation) is an index into causal information stored in the class hierarchy. From this entry point, causal branches form links to related sub-situations. These causally linked sub-situations are selected and explored, proving and refuting the logically-linked sub-situations until the root situation is either proven or refuted. This dynamically-derived combination of situations and causal branches can be viewed as a "diagnosis tree". The class hierarchy and MGC mechanism of the present invention limits the branching according to the specific network being diagnosed. The MGC mechanism limits the set of sub-situations to consider by identifying which causal branches relate to the network being diagnosed.

By exploiting both model-based and causal reasoning, using a network topology model, component class hierarchy, and diagnosis tree structures, the present invention provides an efficient system for network diagnosis. Furthermore, this system can be applied to computer networks having components made by various manufacturers for which detailed information is not available, since the system uses both general knowledge techniques and specific techniques.

DETAILED DESCRIPTION

Figure 1:
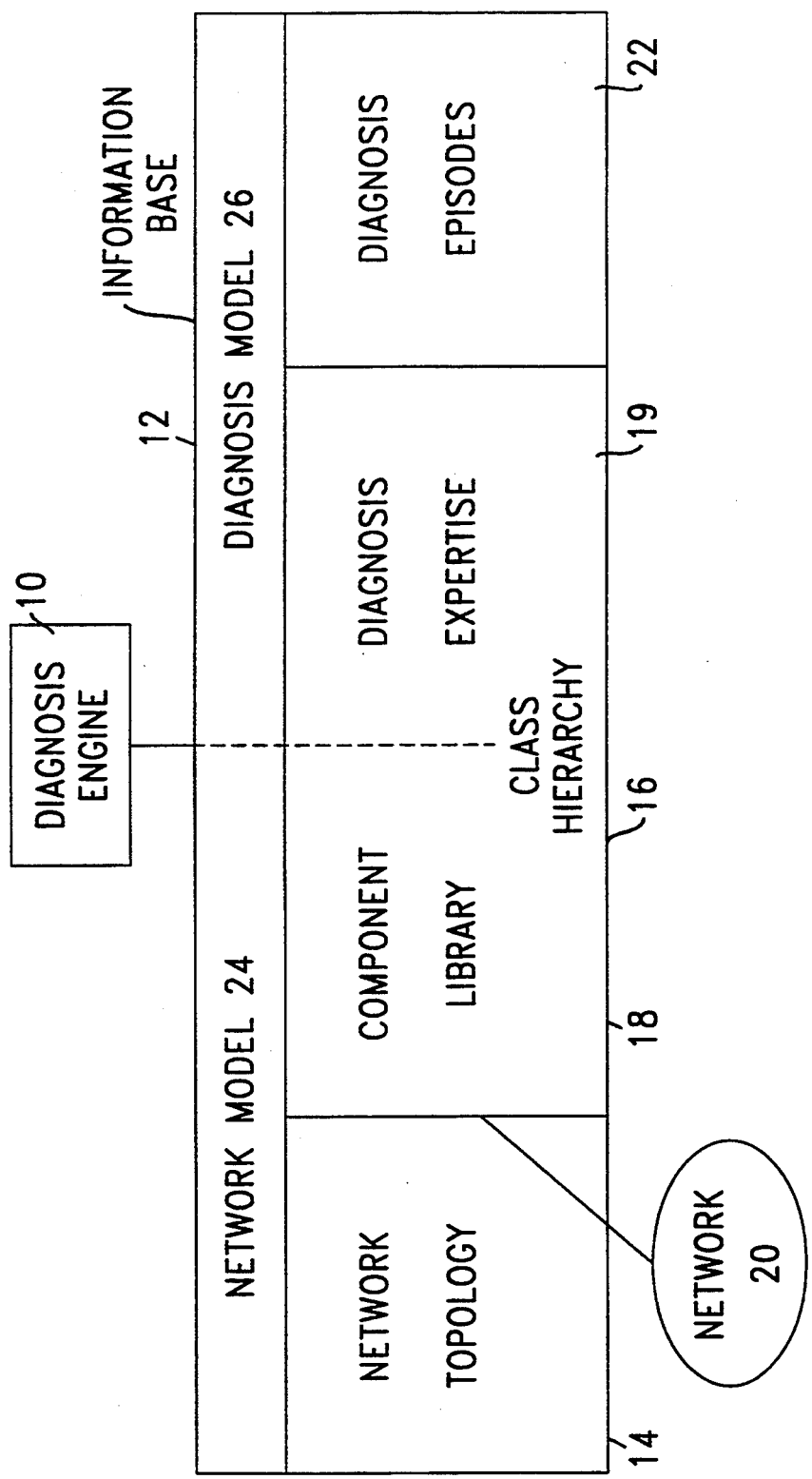
FIG. 1 is a block diagram showing the system of the present invention and the information base used with the invention.

The present invention relates to a method and apparatus for diagnosing local area network (LAN) faults. A system for diagnosing LAN faults is shown in FIG. 1. The system has a diagnosis engine 10, which in the preferred embodiment, is procedural code that performs the diagnosis. The diagnosis engine 10 can be run on one or more standard general purpose computers. As such, the physical structure of the engine 10 will not be described in more detail.

Diagnosis engine 10 has access to an information base 12 which is conceptually divided into a network topology 14, a class hierarchy 16 and diagnosis episode 22. The class hierarchy 16 is further conceptually divided into a component library 18 and diagnosis expertise 19. A network, such as LAN 20, is modeled by the network topology 14. Alternatively, information base 12 can be viewed as conceptually comprising a network model 24 and a diagnosis model 26.

When the diagnosis engine 10 is presented with a problem (a "root situation"), it accesses the information base 12 to diagnose the LAN problem and determine a faulty field replaceable unit (FRU) in one of the components of the LAN 20. As the diagnosis engine 10 proceeds through the steps of a diagnosis, a tree of situations is created in diagnosis episode 22. This tree summarizes the history of the investigative steps taken to identify the faulty component which will repair the problem described by the root situation.

The network topology 14 models individual components, subcomponents of these components, and aggregates of components that comprise the LAN 20. For example, the network topology 14 will contain specific information related to a particular disk drive that is a component of the LAN 20.

The diagnosis expertise 19 encodes troubleshooting knowledge that has been culled from human network troubleshooting experts. The diagnosis expertise 19 contains "situations" which are knowledge structures that are assertions about a network or a network component. The diagnosis expertise 19 includes "causal branches," links between two situations for which there exists a logical connection. The diagnosis expertise 19 also contains actions, which relate situations to the LAN 20, each action either establishing the truth of an associated situation or identifying network entities related to that situation.

The component library 18 contains information as to component specifications, i.e. what is common to all particular examples of a specific component type. This is in contrast to the network topology 14, which contains information as to particular "instances" of a component, i.e. what makes component $A_1$ different from component $A_2$ if both components are of class A. Thus, there are at least two types of component information, class-wide and instance-specific information, contained in the information base 12. For this reason, an embodiment of the present invention uses an object-oriented approach to network modeling.

In an object-oriented system, "classes" describe the kinds of objects that are in the world, and "instances" of these classes are computational representations of actual objects. Objects, both classes and instances, interact with one another by sending "messages". For example, the message "increment" can be sent to a number object and another number object, representing the incremented value, is returned. However, each class may implement its own version of the message, e.g. there are different procedural implementations of "increment" for integers and floating-point numbers. Each of these class-specific implementations is termed a "method". An object-oriented system automatically invokes the proper method when a message is sent to an object.

In an object-oriented system, classes are hierarchically organized so that each class can implement its own method for a given message, or "inherit" the corresponding message and other characteristics of its superclass. In a multiple-inheritance system, a class can have more than one superclass. For example, a transceiver cable is both an ETHERNET cable and a two-ended cable, so that it inherits the properties of both of these two cable classes.

Figure 2:
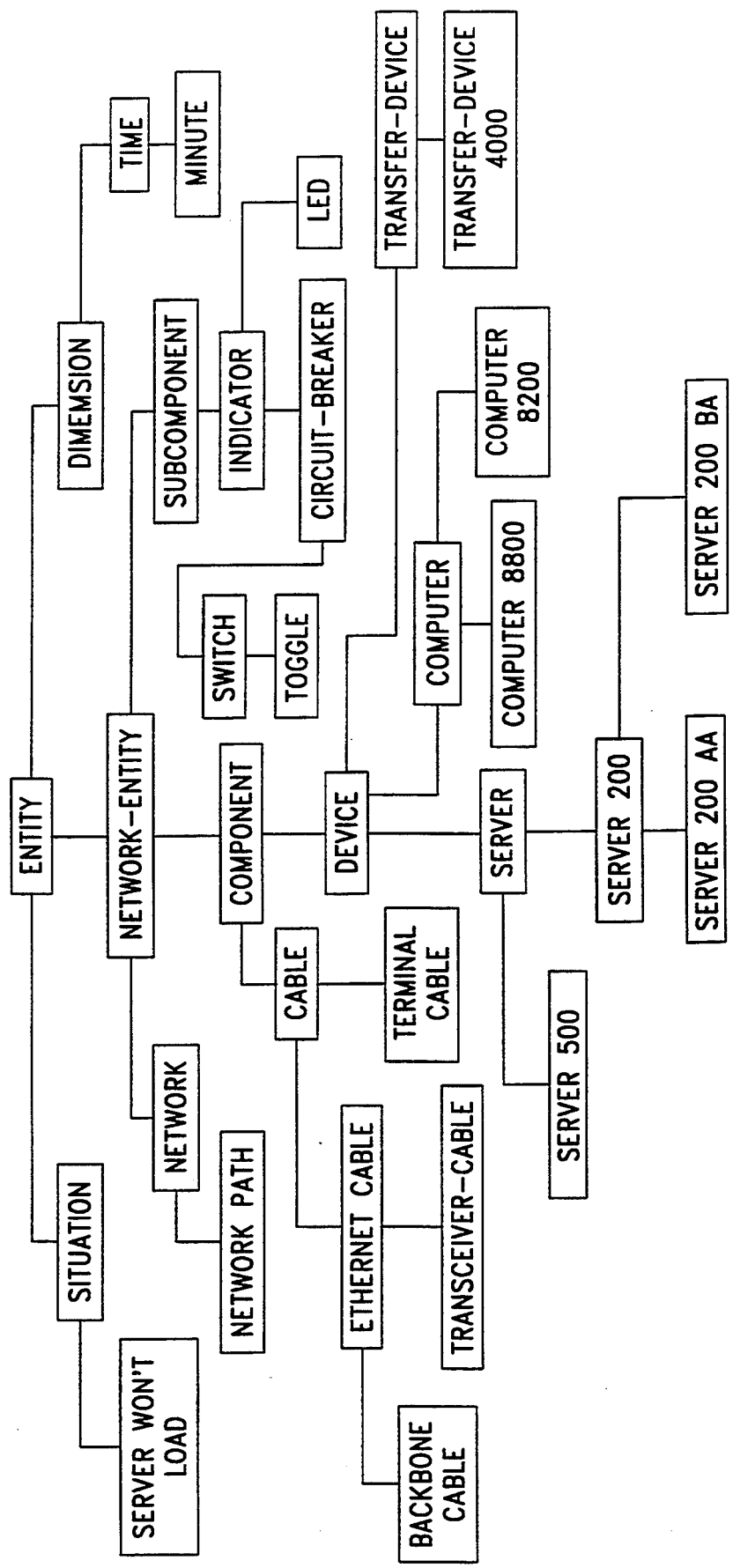
FIG. 2 shows an example of part of a class hierarchy.

In the present invention, the network components and subcomponents, hardware and software, individual components and aggregate components are easily organized into a multiple-inheritance class hierarchy, such as that shown in FIG. 2. The use of higher-level (i.e. more abstract) classes allows a human diagnostic expert to specify general information about all objects in these large classes only once. The expert need not repeat this information for every subclass. The effective use of abstract classes also facilitates diagnosis of third-party components that are connected to the LAN 20 for which detailed information regarding the individual components is lacking.

The class hierarchy shown in FIG. 2 does not represent an actual network, such as LAN 20. Rather, it shows the relationship of classes and subclasses. This allows the present invention to use an approach termed "most general class" (MGC) to identify the causal branches of each situation based upon the specific network topology of the LAN 20. The use of MGC combines general information about a situation with specific details of the network 20 being examined to create a diagnosis episode 22 customized for a particular LAN configuration.

As stated earlier, a situation can be viewed as an assertion about some component of a computer network, a subset of network components, or the network as a whole. The situation can be true or false, and can represent correct operation or a fault. For example, a "symptom" reported by either a human technician or a network monitoring device is represented by the "root situation." The truth-value for this situation must be established by either performing an action associated with that situation, or by examining the truth of sub-situations.

Figure 3:
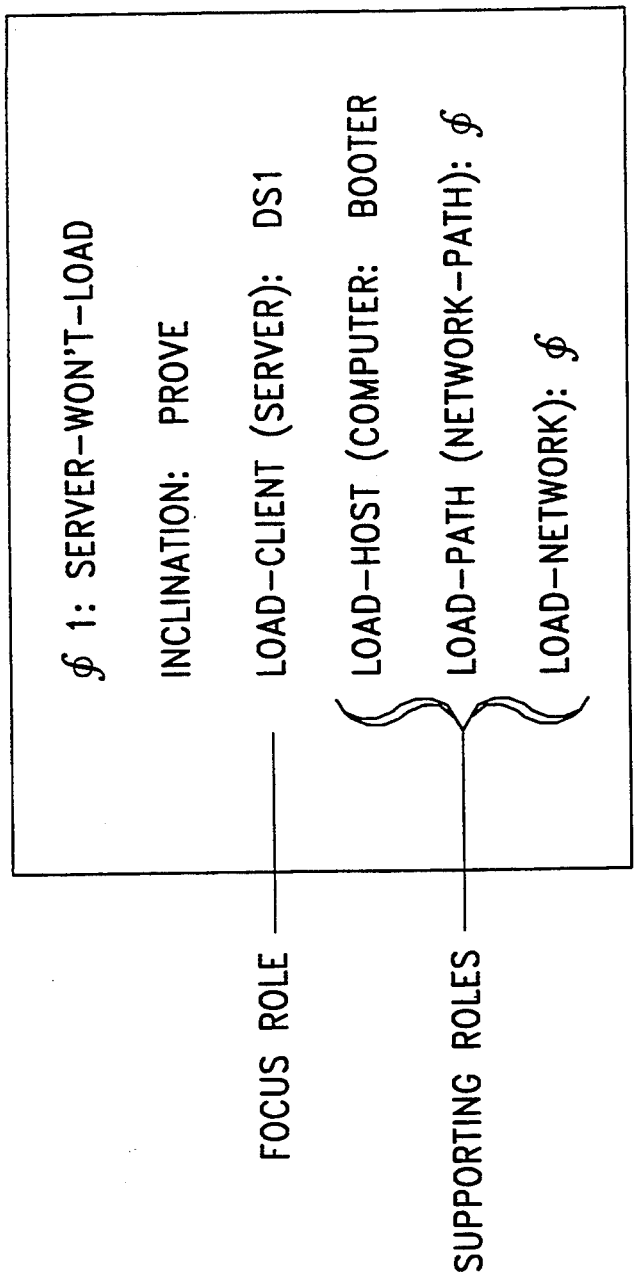
FIG. 3 shows an example of a situation.

An example of a situation is shown in FIG. 3. A situation has one or more "roles" each of which is filled by a network component or a collection of components. This component (or collection) is referred to as the role's "player". One role in each situation is distinguished as the "focus role" while the other roles are "supporting roles". A situation can be viewed as an assertion about its particular focus role player in the context of its supporting role players. For example, the focus role player in a "server won't load" situation is the problematic server. The supporting roles are the network host that is supposed to play the server, the network path that connects the host and the server, and the entire network on which the server and host reside.

In performing its diagnosis, the diagnosis engine 10 investigates a situation, starting with the root situation, to determine whether the situation is true. Truth may be established in one of two ways. The first way is by performing an "action". An action associates procedural code with a situation and enables the system to interact with the human diagnostician or the network being diagnosed. An action can establish a situation's truth value, identify some or all of its role players, or both.

The truth of a situation can also be obtained in a second way, which is by exploring a "causal branch". Situations are often causally linked, for example, "server won't load" is supported by "device is not running" if the load host in the first situation is the same as the stopped device in the second situation. A causal branch encodes the logical relationship between the two situations, while a "role correspondence" equates the players in the two roles "load host" and "stopped device."

There are potentially many causal branches which can be explored from a single situation. However, only a small number may be applicable to a given network topology. To identify the appropriate causal branches for a situation, the methodology mentioned above, MGC, is used in the present invention.

Once a situation is established to be true or false through the investigation of the situation, an associated repair may be asserted. Not all situations assert repairs since a repair is not always readily identifiable. Inclination information is used in exploring situations and sub-situations. The inclination of a situation may be prove, refute or both. This tells how a situation can be used to support the overall diagnosis. (E.g., "proving" a situation with inclination "refute" would not aid a diagnosis.)

A diagnosis episode comprises a tree of situations linked by causal branches, with the root situation being the root of this tree. Establishing the truth of the root situation does not constitute a complete diagnosis until an applicable repair is identified. Causally-linked sub-situations are investigated until the faulty FRU is found and a repair is asserted. Thus, a hierarchical diagnosis is performed.

As mentioned earlier, each situation has roles that are bound to components in the network of interest. The binding of a role to a specific network component is determined by the network topology model 14 and is restricted by the class hierarchy 16. The focus role in a situation must be filled because it is the index into the diagnostic information that is stored in the class hierarchy 16. However, supporting roles may be left vacant unless needed.

In the example of a situation shown in FIG. 3, the situation is "server won't load" and is hereinafter referred to as situation 1. The inclination identifies what needs to be done for the situation, i.e. prove, refute or both, in order to support the objective of the diagnosis. In this case, diagnosis engine 10 attempts to prove that the server won't load. In situation 1, the client is the focus role, and the most general class (MGC) is shown in parenthesis. In this case, the MGC for the client is "server". The role player in this instance is server DS1 which is an instance of server 200 seen in the class hierarchy 16 of FIG. 2. The remaining three roles are the host, the path and the network, which are supporting roles for this situation. The MGC for the host is "computer" while the MGC for path is "network path". The MGC for each role in a situation is specified by the human knowledge engineer. The role player for the host is "BOOTER" while the role player has not yet been determined for the path. The roles of the situation are thus filled with network entities derived from the network topology model 14. In this way, roles relate situations to the actual network 20 that is being diagnosed.

A situation's truth value may be established by its associated proof-actions or inferred from the truth value of situations related by causal branches. These relationships are stored within the network class hierarchy 16, such as that shown in FIG. 2, and are linked to the network topology model 14 through the use of the focus roles. For example, assume the truth of situation 1, "server won't load", can be derived from situation 2, "a computer is down". The truth of the first situation is derived from the second situation if it is known that: (1) computer Q plays the load-host role (a supporting role) in situation 1; Q also plays the hung-computer role (the focus role) in situation 2; and Q is not running.

Situations 1 and 2 above are related by the "supported-by" relationship, one of six causal relationships that are a compilation of the logical implication, equivalence and negation operators. The list of the causal relationships includes, but is not limited to:

| | |
|---|---|
| Supported-by | A is true if B is true |
| Supported-by-not | A is true if B is false |
| Denied-by | A is false if B is true |
| Denied-by-not | A is false if B is false |
| Equivalent-to | A is true if and only if B is true |
| Equivalent-to-not | A is true if and only if B is false |

For a given situation, causal branch information, which can be thought of as pointers to child situations that prove or refute a parent situation, is found in a linear subtree in the class hierarchy 16. The end points of the subtree are the MGC of the focus role in the parent situation and the specific class of the focus-role player in that situation. For situation 1 illustrated in FIG. 3, the MGC of the focus role is server, so that server in the class hierarchy 16 of FIG. 2 is one end point of the subtree. The specific class of the focus role-player (in this situation the client) is server type 200. Thus, server 200 forms the other end point of the subtree.

Starting at a top-level situation, e.g. the reported problem, the causal branches are explored, proving and refuting sub-situations until the top-level situation is either proved or refuted and an applicable repair is asserted. The causal branches that are identified and explored are selected using the focus role class information for each parent situation in turn. In this way, a "tree" of causal branches is built up, attempting to prove or refute the situation at the root of the tree. In other words, the cause of the situation $A_1$ can be explained by following the path of sub-situations that prove $A_1$. Similarly, the reason for disbelieving situation $A_1$ can be explained by following the path that refutes situation $A_1$. In order for a causal branch to be considered to provide an explanation for a parent situation, the truth for a sub-situation that supports that parent situation must be established.

There may be many causal branches to explore at any one time for a situation. The selection of the next causal branch to be explored can be filtered by the use of precondition clauses associated with the causal branch. For example, exploring a particular situation while supporting roles are unbound may not provide useful information. A precondition clause inhibits this undesirable behavior. Furthermore, the causal branch between situations can specify role correspondences, the mapping of role bindings between the parent situation and the child situation. The player in a particular role must be an instance of a subclass of the MGC for that role.

In exploring causal branches, an embodiment of the invention uses a tunable agenda scheduling mechanism to provide guidance on which troubleshooting actions to take, based on an assessment of the cost and benefit of these actions. The diagnosis engine 10, with the agenda scheduling mechanism, attempts to isolate the fault in the LAN 20 at a minimal cost in terms of the impact on the LAN 20 itself and in manpower requirements. One embodiment of scheduling causes actions that have negligible costs (i.e., less than $5.00) to be performed immediately, with other actions being postponed ("posted to the agenda") until all of the causal branches have been explored. Hopefully, one of these branches will have an action that has a negligible cost that will provide the correct diagnosis. If this does not occur, then the posted actions are eventually performed in order of increasing cost.

Figure 5:
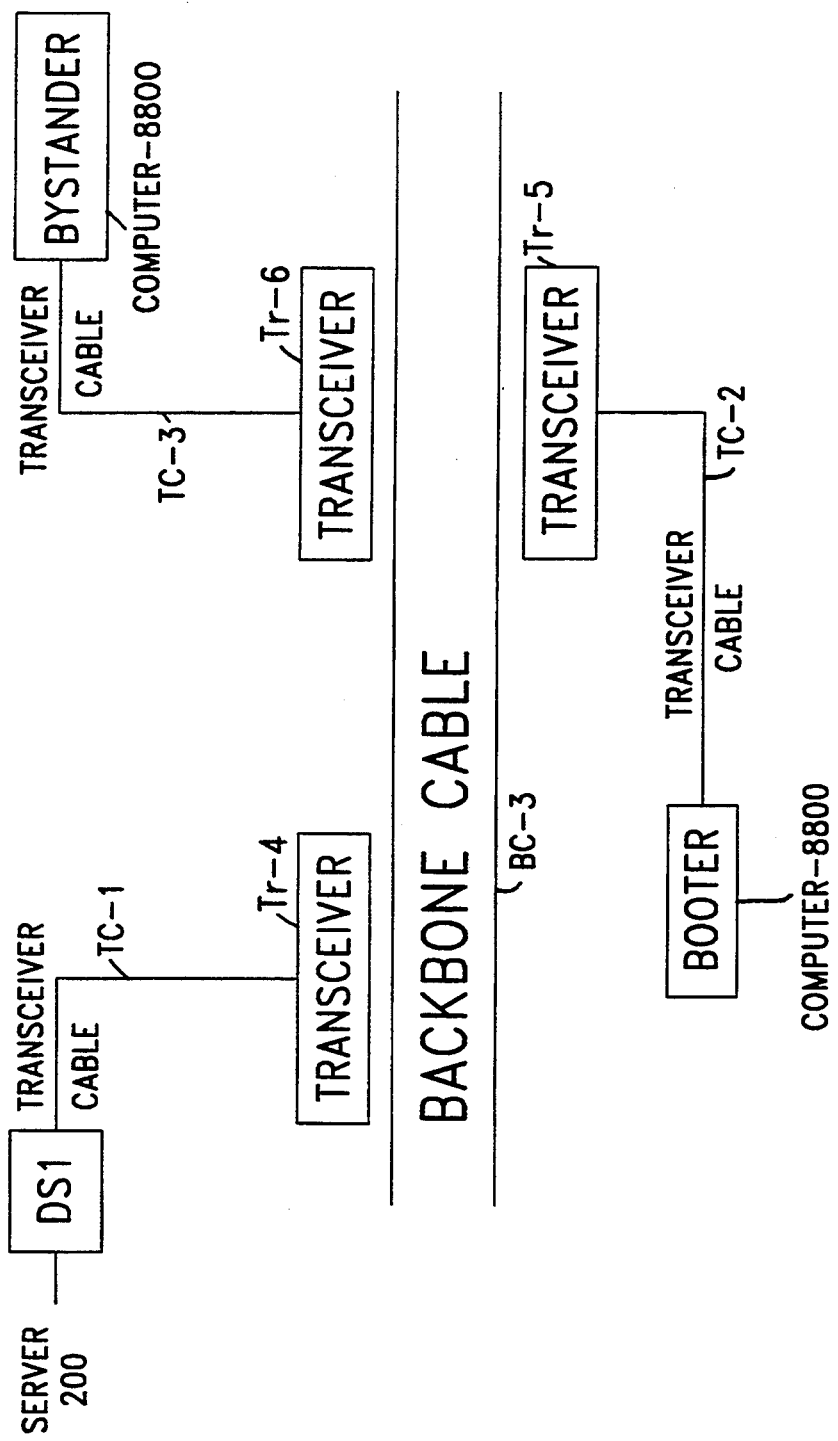
FIG. 5 shows an example of a part of a network to be diagnosed.

An example of a part of a LAN 20 is illustrated in FIG. 5. This part of the network is labeled DSNet. There is a backbone cable BC-3, to which are coupled transceivers TV-4, TV-5, TV-6. These transceivers TV-4, TV-5, TV-6 are instances of the class transfer-device 4000. The transceiver TV-4 is coupled to a server 200, labeled DS1, via a transceiver cable TC-1. An instance of a computer 8800, labeled BYSTANDER, is coupled to transceiver TV-6 via a transceiver cable TC-3. Another instance of a computer 8800, labeled BOOTER, is coupled to transceiver TV-5 via transceiver cable TC-2. An instance of a network path, labeled LINK, comprises (in order) transceiver cable TC-1, transceiver TV-4, backbone cable BC-3, transceiver TV-5, and transceiver cable TC-2. This instance of a network path, LINK, is an aggregate of those specific components in DSNet that form the network path between DS1 and BOOTER.

Figure 4A:
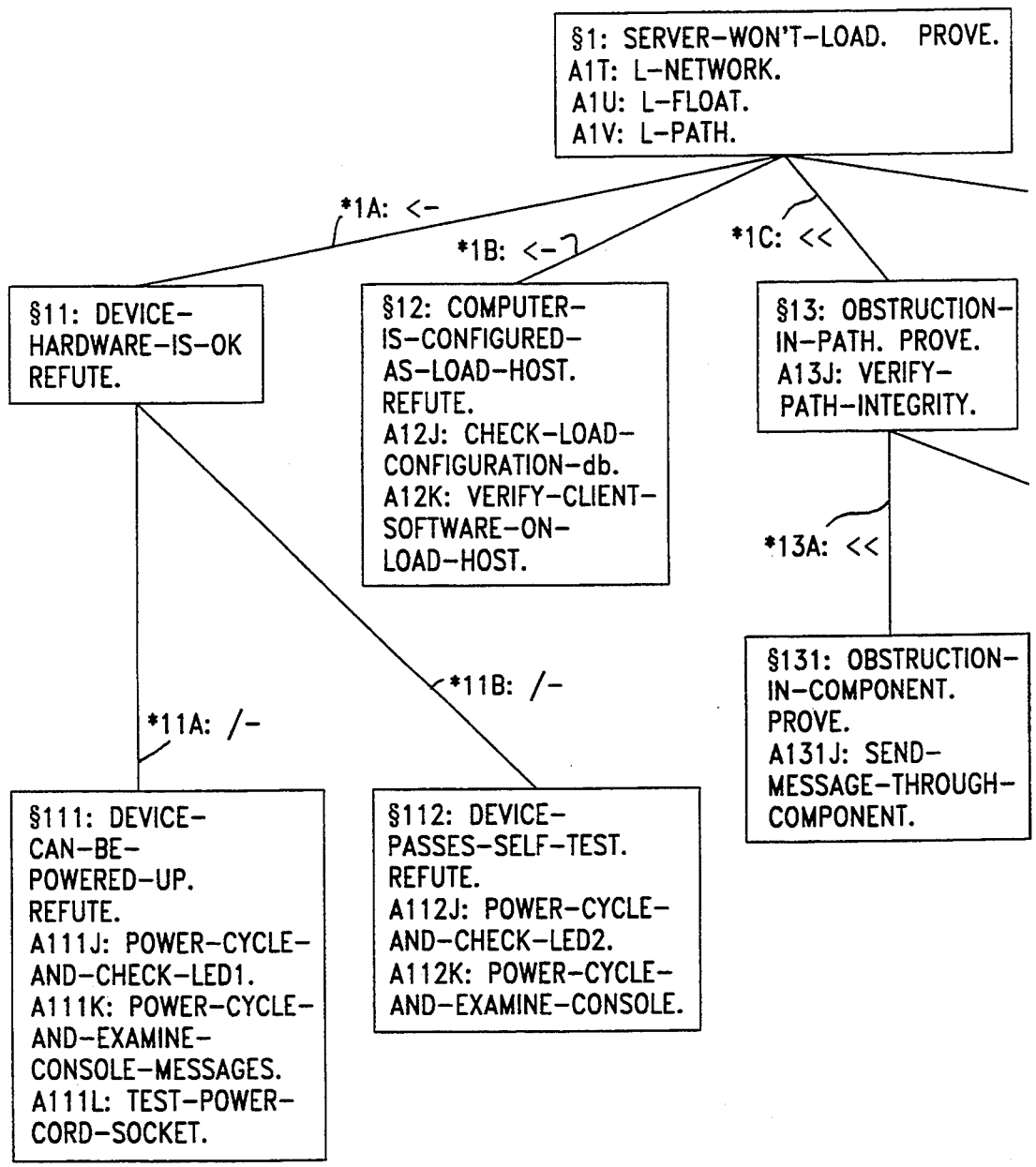
FIG. 4 shows an example of a diagnosis tree.
Figure 4B:
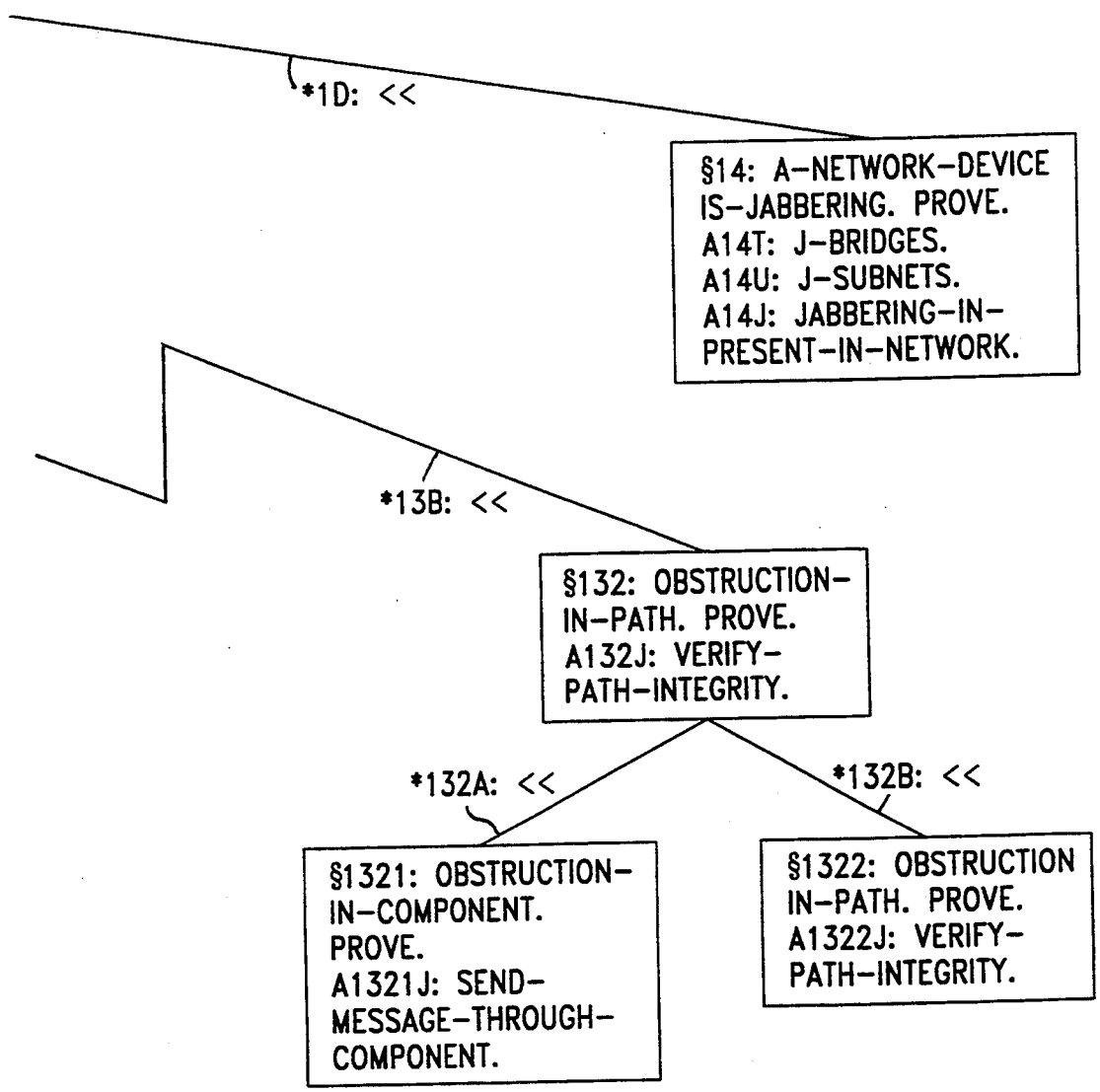

An example of a diagnosis of a problem in the network described above will serve to clarify the operation of the present invention. Accordingly, an example problem and a diagnosis tree is illustrated in FIG. 4. For this example, the following symbols are used and can be seen in FIG. 4.

| § | A situation. |
| A | An action. |
| * | A causal branch. |
| φ | A vacant role. |
| = | Is equal to. |
| << | Is-supported-by. |
| <~ | Is-supported-by-not. |
| // | Is-denied-by. |
| /~ | Is-denied-by-not. |
| == | Is-equivalent-to. |
| =~ | Is-equivalent-to-not. |
| MGC=Most-general-class. The MGC for a role is enclosed in parentheses. | |

(The capital letter before a role, such as "L" in "L-Client", simply refers to a role for a specific situation.)

The user describes a problem to the diagnosis engine 10. This problem is:

Server won't load, with the load client (L-Client) being server DS1. The diagnosis engine 10 verifies that DS1 is a sub-instance of server and instantiates:

| §1: Server-won't load. | |
| L-Client (server): | DS1 |
| L-Network (network): | φ |
| L-Host (computer): | φ |
| L-Path (network-path): | φ |

The inclination for the root situation is set to "prove." There are no actions for truth for this situation (S1). However, there are negligible-cost actions which identify the player in each of the supporting roles:

| ÅlT: | L-Network |
| ÅlU: | L-Host |
| ÅlV: | L-Path |

Although each action has negligible cost, these are real, finite costs. The least expensive action is Å1T: this action binds L-Network to DSnet. The next most expensive is Å1V: this does not succeed since L-Host must be bound first. This is required by the action, not by the diagnosis mechanism. Finally, Å1U is tried, which binds L-Host to BOOTER (an instance of a computer). Now action Å1V is performed again: L-Path is bound to LINK (an instance of a network-path and is specifically the path from DS1 to BOOTER).

At this point, we have the situation:

| §1: Server-won't load. | |
| L-Client (server): | DS1 |
| L-Network (network): | DSnet |
| L-Host (computer): | BOOTER |
| L-Path (network-path): | LINK |

There are four causal branches below §1, as seen in FIG. 4. These causal branches have been extracted from the class hierarchy 16 by referring to the class information in the focus role of situation §1. In this case, the MGC of the focus role is server; the specific class of the focus-role player is server 200. The four causal branches are:

*1A Device Hardware is OK.
Preconditions: φ
Correspondences: L-Client=H-Device
*1B Computer is configured as load-host.
Preconditions: φ
Correspondences: L-Host=A-Host
L-Client=A-Client
*1C Obstruction in path.
Preconditions: φ
Correspondences: L-Path=T-Path
*1D A network device is jabbering.
Preconditions: φ
Correspondences: L-Network=J-Network The first role in each role-correspondence belongs to the parent situation; the second role belongs to the child situation.

All four branches support the parent situation §1, based upon its inclination. Any of these branches may be explored.

Branch *1A is selected arbitrarily. The system binds H-Device to DS-1 (the component playing the L-Client role), verifies that DS-1 is a sub-instance of Device, and instantiates:

§11: Device hardware is OK.
H-Device ( device ): DS1
The Parent inclination was prove, the relationship is '< ~', so the inclination for this situation is set to "refute."

There are no actions for this situation (§11). There are two causal branches:
*11A/Device can be powered up.
Preconditions: φ
Correspondences: H-Device=U-Device; and
*11B/Device passes self-test.
Preconditions: φ
Correspondences: H-Device=T-Device.

Both of these two branches refute, matching the refute inclination of situation §11.

*11B is then selected. The system binds T-Device to DS-1 (from L-Client), verifies that DS1 is a sub-instance of Device and instantiates:
§112: Device passes self-test.
T-Device (device): DS1
The Parent inclination was refute, the relationship is '/ ~' so the inclination for this situation is set to refute.
There are two actions for this situation:
Å112J: Power-cycle and check LED2.
Å112K: Power-cycle and examine console messages (self-test).

Both of these actions have non-negligible cost, so both actions are posted to the agenda.

There are no causal branches below §112, so the diagnosis engine 10 backs up to §11. At this point, *11A—the remaining unexplored branch-is selected.

The system binds U-Device to DS-1, verifies that DS1 is a sub-instance of Device and instantiates:
§111 Device can be powered up.
U-Device (device): DS1.
The Parent inclination was refute, the relationship is '/ ~' so the inclination for this situation is set to refute.
There are three actions for this situation:
Å111J: Power-cycle and check LED1.
Å111K: Power-cycle and examiner console messages (anything).
Å111L: Test power cord socket.

All of the above actions have non-negligible cost, so that all actions are posted to the agenda.

There are no causal branches below §111, so the computer 10 backs up to §11. There are also no unexplored branches below §11, so the diagnosis engine 10 backs up to §1.

Causal branch *1B is now selected arbitrarily. The system binds roles, verifies MGC satisfaction, and instantiates:
§12: Computer is configured as load-host.
A-Host ( computer ): BOOTER.
A-Client (server): DS1.
The Parent inclination was prove, the relationship is '< ~', so the inclination for this situation is set to refute.
There are two actions for this situation:
Å12J: Check load configuration database.
Å12K: Verify client software on load host.
Both actions have non-negligible cost so that both actions are posted to the agenda.

Since there are no causal branches below §12, the diagnosis engine 10 backs up to §1. At this point *1D is selected arbitrarily.

The branch from §1, *1D, leads to:
§14: A network device is jabbering.
J-Network (network): DSNet.
J-Bridges (bridge-set): . .
J-Subnets (subnetwork-set): .

The Parent inclination was prove, the relationship is '< <', so the inclination for this situation is set to prove.
There are two role-player actions for this situation:
Å14T: J-Bridges
Å14U: J-Subnets
There is one truth action (non-negligible cost):
Å14J: Jabbering is present in network.
This truth action listens to the network for noise.

Since there are no causal branches below §14, the diagnosis engine 10 backs up to §1. Exploring branch *1C, the diagnosis engine 10 binds roles, verifies MGC satisfaction, and instantiates:
§13: Obstruction in path
T-Path (network-path): LINK.
The Parent inclination was prove, the relationship is '< <', so the inclination for this situation is set to prove.
There is one action for this situation:
Å13J: Verify path integrity.

This sends a message from one end of the path to the other. It has non-negligible cost, so it is posted to the agenda. There are two causal branches below §13. The first leads to:
§131: Obstruction-in-component
O-Component (component): TC-1
Action Å131J (send message through component) has non-negligible cost, and is posted to the agenda. The other causal branch (*13B) is now explored. It leads to:
§132: Obstruction-in-path
T-path (network-path): TV-4, BC-3, TV-5, TC-2
This situation examines whether there is an obstruction in the network path that remains without the first component (TC-1) in the path LINK. Note that §132 is a second instance of the same situation class, "Obstruction-in-path." Further subsituations are recursively explored, each time removing another component from the path (originally LINK), until one of the components is shown to be the obstruction. For example, from §132, there are two causal branches, §1321 and §1322. The first subsituation:
§1321: Obstruction-in-component
O-Component (component): TV-4
If there is an obstruction in component TV-4 (i.e. §1321 is "true"), then a repair or replacement of TV-4 is asserted. Otherwise, the remainder of the path is explored in the other causal branch:
§1322: Obstruction-in-path
T-path (network-path): BC-3, TV-5, TC-2
Again, if this branch proves, further sub-situations are explored, until the fault component is isolated.

A tree of situations, linked by causal branches, has thus been created as shown in FIG. 4. An agenda containing useful actions with non-negligible cost vectors has also been created. If the negligible-cost actions have failed to complete the diagnosis, the actions posted to the agenda earlier will be used. The least-expensive action, based upon a comparison of each action's cost vector, is chosen. This action is now performed. If successful, the action will establish the truth of its associated situation. This truth is propagated upwards as far as possible.

An action's cost possesses several dimensions (real time, computer time, network traffic, money, human resources). Cost may also exhibit time-variance within each dimension. Assume that numerous non-neligible-cost actions have been posted to the agenda.

Choose action Å12K: Verify-client-software-on-host. The software is checked over the network. The software is all right and does not affect the truth of §12. (If the software were invalid or missing, §12 would be refuted). The next action chosen is Å12J: Check-load-configuration-database. Again, a network request shows the host to be correctly configured.

Continue with action: "Å111K: Check-console-message-for-powerup", is chosen. A human diagnostician is directed to power-cycle DS1 and observe the console. The messages which appear indicate successful powerup, thereby proving §111. The messages also indicate that DS1 passes its self-test; this information is cached. This lowers the cost of Å112K to negligible; the cost vector is modified automatically.

The next action selected is Å112K: Check-console-message-for-self-test-passed. The database returns OK and §112 is proven.

Actions continue to be selected from the agenda and performed until the problem in the network is identified. To illustrate, say action Å131K (examine-component-connections) is selected. The diagnostician is asked to check the network connections of the component playing the O-Component role is situation §131 (transceiver cable TC-1). If the diagnostician reports that the cable is disconnected at one end, situation §131 is established as true. This truth value is propagated along causal branches *13A and *1C, establishing §13 and §1 as true. Since situation §131 is true, §131's inclination is "prove," and §131 has a "repair-when-true," the repair "Fix TC-1 [the player in the O-Component role]" is asserted, and diagnosis is completed. The field replaceable unit (FRU) responsible for the fault, as well as the appropriate repair, have been identified.

What is claimed:

1. A computer-based method utilizing model-based reasoning for performing fault diagnosis in a network having components and subcomponents, the method comprising the steps of:

providing a component library that stores, as a hierarchical structure, possible components and subcomponents for the network, information related to components and subcomponents, and interrelationships between components and subcomponents;

providing a network topology information base that models the components and subcomponents of the network;

providing a plurality of situations, each situation being an assertion about a single component of the network or a set of components of the network, each situation including an inclination that specifies whether the assertion is to be proved or refuted, each situation optionally including an action that is associated with procedural code to perform a fault diagnostic function, each situation optionally including one or more links to related situations;

receiving a report of a problem in a component of the network;

instigating a root situation representing the problem reported, the root situation being one of the plurality of situations;

setting the inclination of the root situation to prove; and performing a hierarchical diagnosis to diagnose the problem reported by:

(i) performing the action for the root situation if the root situation has an action that supports the inclination of the root situation, (ii) if the root situation does not have an action that supports the inclination for the root situation, utilizing the component library to select other situations that will support the inclination of the root situation, (iii) setting the inclination for each selected situation, (iv) performing the action for each selected situation if the selected situation has an action that supports the inclination of the selected situation, (v) if the selected situation does not have an action that supports the inclination for the selected situation, utilizing the component library to select other situations linked to the selected situation that will support the inclination of the selected situation, and (vi) recursively repeating substeps (iii) to (v) for each selected situation until the fault is diagnosed.

2. The method of claim 1 wherein the component library, the network topology information base and the plurality of situations are stored in a memory device.

3. The method of claim 1 wherein the component library, the network topology information base and the plurality of situations are stored in an information base.

4. The method of claim 1 wherein an action for a situation establishes a truth value for the situation.

5. The method of claim 1 wherein the network is a local area network.

6. The method of claim 5 wherein the local area network comprises components made by more than one manufacturer.

7. The method of claim 1 wherein each one of the plurality of situations includes roles that bind each situation to components and subcomponents stored in the component library.

8. The method of claim 7 further comprising the step of utilizing the network topology information base to bind each role to a relevant component or subcomponent of the network.

9. A computer-based method utilizing model-based reasoning for performing fault diagnosis in a network having components, the method comprising the steps of:

storing in a component library, as a hierarchical structure, possible components for the network, information related to components, and interrelationships between components;

storing a plurality of situations, each situation being an assertion about one or more components of the network, each situation including an inclination that specifies whether the assertion is to be proved or refuted, each situation optionally including an action to perform a diagnostic function, each situation optionally including one or more links to other situations;

receiving a report of a fault in a component of the network;

instigating a root situation representing the problem reported, the root situation being one of the plurality of situations;

creating a diagnosis tree by:

(i) adding the action for the root situation to an agenda, (ii) if the root situation does not have an action, utilizing the component library to select other situations that will support the inclination of the root situation, (iii) adding the action for each selected situation to the agenda if the selected situation has an action, (iv) if the selected situation does not have an action, utilizing the component library to select other situations that will support the inclination of the selected situation, and (v) recursively repeating substeps (iii) and (iv) for each selected situation;

ranking each action on the agenda according to a preselected scheme;

performing, in turn, each action on the agenda until the fault in the network is identified.

10. The method of claim 9 wherein each action is associated with procedural code that performs a diagnostic function.

11. The method of claim 9 wherein performing each action of a situation establishes a truth value for the situation.

12. The method of claim 9 wherein a component includes a set of subcomponents.

13. The method of claim 9 further comprising the step of setting the inclination of the root situation to prove.

14. The method of claim 9 wherein the component library, the network topology information base and the plurality of situations are stored in a memory device.

15. The method of claim 9 wherein the network is a local area network.

16. The method of claim 9 wherein each one of the plurality of situations includes one or more roles, each role binding each situation to a component stored in the component library.

17. The method of claim 16 further comprising the step of utilizing the network topology information base to bind each role to a relevant component of the network.

18. A computer-based method utilizing model-based reasoning for performing fault diagnosis in a network having components, the method comprising the steps of:

providing a class hierarchy, the class hierarchy including a component library and diagnostic expertise, the component library storing possible components for the network and interrelationships between components;

providing a plurality of situations, each situation being an assertion about one or more components of the network, each situation including an inclination that specifies whether the assertion is to be proved or refuted, each situation optionally including an action to perform a diagnostic function;

receiving a report of a fault in a component of the network;

instigating a root situation representing the problem reported, the root situation being one of the plurality of situations; and creating a diagnosis tree by:

(i) adding the action for the root situation to an agenda, (ii) if the root situation does not have an action, utilizing the class hierarchy to select other situations that will support the inclination of the root situation, (iii) adding the action for each selected situation to the agenda if the selected situation has an action, (iv) if the selected situation does not have an action, utilizing the class hierarchy to select other situations that will support the inclination of the selected situation, (v) recursively repeating substeps (iii) and (iv) for each selected situation, and (vi) performing each action on the agenda to elicit information to prove or refute a selected situation until the fault in the network is identified.

19. The method of claim 18 further comprising the step of modifying the diagnosis tree as a result of each action performed.

20. A computer-implement system for performing fault diagnosis in a computer network having components and subcomponents, the system comprising:

a component library storing, as a hierarchical structure, possible components and subcomponents for the network, information related to components and subcomponents, and interrelationships between components and subcomponents;

a network topology information base modelling the components and subcomponents of the network;

a plurality of situations, each situation being an assertion about a single component of the network or a set of components of the network, each situation including an inclination that specifies whether the assertion is to be proved or refuted, each situation optionally including an action that is associated with procedural code to perform a fault diagnostic function, each situation optionally including one or more links to related situations;

means for receiving a report of a problem in a component of the network;

means for instigating a root situation representing the problem reported, the root situation being one of the plurality of situations; and means for performing a hierarchical diagnosis, said means including:

(i) means for performing the action for the root situation if the root situation has an action that supports the inclination of the root situation, (ii) means for utilizing the component library to select other situations linked to the root situation that will support the inclination of the root situation if the root situation does not have an action that supports the inclination for the root situation, (iii) means for setting the inclination for each selected situation, (iv) means for performing the action for each selected situation if the selected situation has an action that supports the inclination of the selected situation, and (v) means for utilizing the component library to select other situations linked to a selected situation that will support the inclination of the selected situation if the selected situation does not have an action that supports the inclination for the selected situation.

21. The system of claim 20 wherein the component library, the network topology information base and the plurality of situations are stored in a memory device.

22. The system of claim 20 wherein the network is a local area network.

23. The system of claim 20 wherein each one of the plurality of situations includes roles that bind each situation to components and subcomponents stored in the component library.

24. The system of claim 23 further comprising means for utilizing the network topology information base to bind each role to a relevant component or subcomponent of the network.

25. A computer-implemented system for performing fault diagnosis in a network having components, the system comprising:
- a component library storing, as a hierarchical structure, possible components for the network and interrelationships between components;
- a plurality of situations, each situation being an assertion about one or more components of the network, each situation including an inclination that specifies whether the assertion is to be proved or refuted, each situation optionally including an action to perform a diagnostic function, each situation optionally including one or more links to related situations;
- means for receiving a report of a fault in a component of the network;
- means for instigating a root situation representing the problem reported, the root situation being one of the plurality of situations;
- means for creating a diagnosis tree, said means including
  - means for adding the action for the root situation to an agenda,
  - means for utilizing the component library to select other situations that will support the inclination of the root situation if the root situation does not have an action,
  - means for adding the action for each selected situation to the agenda if the selected situation has an action, and
  - means for utilizing the component library to select other situations that will support the inclination of the selected situation if the selected situation does not have an action;
- means for ranking each action on the agenda according to a preselected scheme; and
- means for performing, in turn, each action on the agenda until the fault in the network is identified.

26. The system of claim 25 wherein each action is associated with procedural code that performs a diagnostic function.

27. The system of claim 25 wherein performing each action of a situation establishes a truth value for the situation.

28. The system of claim 25 wherein a component includes a set of subcomponents.

29. The system of claim 25 further comprising means for setting the inclination of the root situation to prove.

30. The system of claim 25 wherein the component library, the network topology information base and the plurality of situations are stored in a memory device.

31. The system of claim 25 wherein each one of the plurality of situations includes one or more roles, each role binding each situation to a component stored in the component library.

32. The system of claim 31 further comprising means for utilizing the network topology information base to bind each role to a relevant component of the network.

33. A computer-implemented system utilizing a model-based reasoning for performing fault diagnosis in a computer network having components, the system comprising:
- a class hierarchy including a component library and diagnostic expertise, the component library storing possible components for the network and interrelationships between components;
- a plurality of situations, each situation being an assertion about one or more components of the network, each situation including an inclination that specifies whether the assertion is to be proved or refuted, each situation optionally including an action to perform a diagnostic function, each situation optionally including one or more links to related situations;
- means for receiving a report of a fault in a component of the network;
- means for instigating a root situation representing the problem reported, the root situation being one of the plurality of situations; and
- means for creating a diagnosis tree, said means including:
  - means for adding the action for the root situation to an agenda,
  - means for utilizing the class hierarchy to select other situations that will support the inclination of the root situation if the root situation does not have an action,
  - means for adding the action for each selected situation to the agenda if the selected situation has an action,
  - means for utilizing the class hierarchy to select other situations that will support the inclination of the selected situation if the selected situation does not have an action, and
  - means for performing each action on the agenda to elicit information to prove or refute a situation until the fault in the network is identified.

34. The system of claim 33 further comprising means for modifying the diagnosis tree as a result of each action performed.

35. The system of claim 33 wherein the class hierarchy includes causal branches associated with classes in the class hierarchy.

36. The system of claim 35 wherein the class hierarchy is a multiple-inheritance class hierarchy.

37. The system of claim 36 wherein at least one situation has an associated action that establishes a truth of that situation or identifies a role player in the situation.

38. The system of claim 37 wherein at least one causal branch links two situations, said causal branch representing one of a plurality of causal relationships.

* * * * *